(12) United States Patent
Strickland

(10) Patent No.: US 7,471,512 B1
(45) Date of Patent: Dec. 30, 2008

(54) STORAGE SYSTEM ASSEMBLY EMPLOYING REPEATER AMPLIFIERS IN I/O EXPANSION MODULE

(75) Inventor: Stephen Strickland, Foxboro, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 11/863,550

(22) Filed: Sep. 28, 2007

(51) Int. Cl.
*H05K 5/00* (2006.01)
*H05K 7/00* (2006.01)
*G06F 3/00* (2006.01)
*G06F 1/16* (2006.01)

(52) U.S. Cl. .............. 361/686; 361/684; 710/2; 710/3

(58) Field of Classification Search ................ 361/684, 361/686; 710/2, 3, 29
See application file for complete search history.

(56) References Cited

U.S. PATENT DOCUMENTS

| | | | | |
|---|---|---|---|---|
| 5,666,497 | A * | 9/1997 | Milhaupt et al. | 710/305 |
| 6,411,506 | B1 * | 6/2002 | Hipp et al. | 361/686 |
| 7,154,747 | B2 * | 12/2006 | Tufford et al. | 361/686 |
| 7,375,960 | B2 * | 5/2008 | Blaalid et al. | 361/685 |
| 7,391,607 | B2 * | 6/2008 | Minami | 361/685 |
| 2003/0151891 | A1 * | 8/2003 | Paul | 361/686 |
| 2005/0104623 | A1 * | 5/2005 | Guo et al. | 326/82 |
| 2005/0190536 | A1 * | 9/2005 | Anderson et al. | 361/686 |

OTHER PUBLICATIONS

National Semiconductor Corporation; DS25BR400, "Quad Transceiver with Input Equalization and Output De-Emphasis", Dec. 2006.

National Semiconductor Corporation; DS25MB200, "Dual 2.5 Gb/s 1:2 Mux/Buffer with Input Equalization and Output Pre-Emphasis", Jul. 2006.

National Semiconductor Corporation; "PCI Express Using National Semiconductor DS25MB100, DS25MB200 and DS25BR400", Aug. 2006.

PMC-Sierra, Inc.; PM8380 QuadSMX 3G, "4-Channel Multiplexer and Link Extender for SAS, SATA, Ethernet and FC", PMC-2030351 Issue 3, 2004.

(Continued)

*Primary Examiner*—Jayprakash N Gandhi
*Assistant Examiner*—Anthony M Haughton
(74) *Attorney, Agent, or Firm*—BainwoodHuang

(57) ABSTRACT

A storage system assembly includes a storage processor (SP) module and an input/output (I/O) expansion module disposed between an and opening of an enclosure and a midplane circuit board. The SP module includes (i) a storage processor, (ii) first I/O interface modules at the end opening, and (iii) circuit traces of high-speed serial data links, the circuit traces including first circuit traces interconnecting the storage processor with the first I/O interface modules, and second circuit traces interconnecting the storage processor with the circuit traces of the midplane. The I/O expansion module includes (i) second I/O interface modules at the end opening of the enclosure, (ii) a set of repeater amplifiers, and (iii) circuit traces of the high-speed serial data links, the circuit traces including third circuit traces interconnect the repeater amplifiers with the second I/O interface modules, and fourth circuit traces interconnect the repeater amplifiers with circuit traces of the midplane, such that the second, third and fourth circuit traces along with the circuit traces of the midplane interconnect the storage processor with the second I/O interface modules via the repeater amplifiers. The repeater amplifiers perform electrical regeneration of high-speed binary data signals between the third and fourth circuit traces.

8 Claims, 3 Drawing Sheets

OTHER PUBLICATIONS

Bhatt, Ajay V.; Technology and Research Labs, Intel Corporation; "Creating a Third Generation I/O Interconnect", White Paper, 2002.

Sullivan, Douglas et al.; "Environmental and Health Monitoring Circuitry for Storage Processor I/O Annex Module", Pending U.S. Appl. No. 11/395,460, filed Mar. 31, 2006.

* cited by examiner

STORAGE SYSTEM ASSEMBLY EMPLOYING REPEATER AMPLIFIERS IN I/O EXPANSION MODULE

BACKGROUND

The present application is related to the field of storage system assemblies.

Storage system assemblies are known in which a storage processor is coupled to input/output (I/O) modules by high-speed serial data links, such as serial data links embodying the so-called PCI-Express standard. A PCI-Express link employs one or more single-bit serial lines, individually termed "lanes", to effect high-rate data transfer between the storage processor and an I/O module. A typical I/O module may provide interconnection to a storage-oriented interconnect bus, such as Fiber Channel or SCSI interconnect buses.

It has been known to mount I/O modules directly to a storage processor module which includes the storage processor, such that the high-speed serial data links are carried directly between the storage processor and the I/O modules by relatively short circuit traces formed on the storage processor module. It has also been known to place the storage processor and the I/O modules on separate modules, and to utilize an intermediate device known as a PCI Express switch on the path between the storage processor and the I/O modules. This arrangement provides for expandability of the I/O interconnect in a system without requiring the addition of storage processor modules. The PCI Express switch examines the addresses of PCI transactions received from a given PCI-Express link and routes the transactions to devices on other PCI-Express links accordingly.

SUMMARY

A switch device such as the PCI-Express switch is a relatively complex device that consumes resources such as real estate and power within the system, as well as adding to the cost of the system. It would be desirable to provide for expandability of I/O interconnects in a storage system without entailing the resource consumption and cost of a complex device such as a PCI-Express switch.

A storage system assembly includes an enclosure having an end opening, and a midplane circuit board having mounting locations with circuit traces extending therebetween. A storage processor module is disposed in the enclosure between the end opening of the enclosure and a first mounting location of the midplane circuit board, and includes (i) a storage processor, (ii) first input/output (I/O) interface modules at the end opening of the enclosure, and (iii) circuit traces of high-speed serial data links, the circuit traces including first circuit traces interconnecting the storage processor with the first I/O interface modules, and second circuit traces interconnecting the storage processor with the circuit traces of the midplane circuit board. The storage system assembly further includes an I/O expansion module disposed in the enclosure between the end opening of the enclosure and a second mounting location of the midplane circuit board. The I/O expansion module includes (i) second I/O interface modules at the end opening of the enclosure, (ii) a set of repeater amplifiers, and (iii) circuit traces of the high-speed serial data links, the circuit traces including third circuit traces interconnecting the repeater amplifiers with the second I/O interface modules, and fourth circuit traces interconnecting the repeater amplifiers with the circuit traces of the midplane circuit board, such that the second, third and fourth circuit traces along with the circuit traces of the midplane circuit board interconnect the storage processor with the second I/O interface modules via the repeater amplifiers. The repeater amplifiers perform electrical regeneration of high-speed binary data signals between the third and fourth circuit traces.

The repeater amplifiers are generally much simpler in operation than switch devices like PCI-Express switches, and generally cost less and consume less system resources. Thus the storage system assembly provides for the desired expandability of I/O interconnects without the attendant costs and drawbacks of switch devices such as PCI-Express switches.

DETAILED DESCRIPTION

Figure 1:
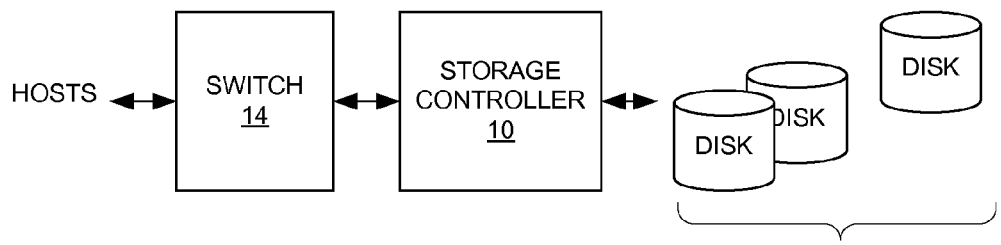
FIG. 1 is a block diagram of a data storage system in accordance with the present invention.

FIG. 1 shows a storage system including a storage controller 10 coupled to a plurality of disk drives (disks) 12. The storage controller 10 is also coupled to host computers (hosts, not shown), via one or more switches 14. In operation, storage requests generated by the hosts are routed through the switch 14 to the storage controller 10, which satisfies the requests using the storage resources provided by the disks 12. The storage controller 10 may implement semiconductor memory caching as temporary storage for data that resides on the disks 12. The configuration shown in FIG. 1 may be seen as a "storage area network" or SAN configuration. However, the storage controller 10 may also be used in other configurations, including directly attached to one or more hosts and attached to a network, the latter being referred to as "network attached storage" or NAS.

Figure 2:
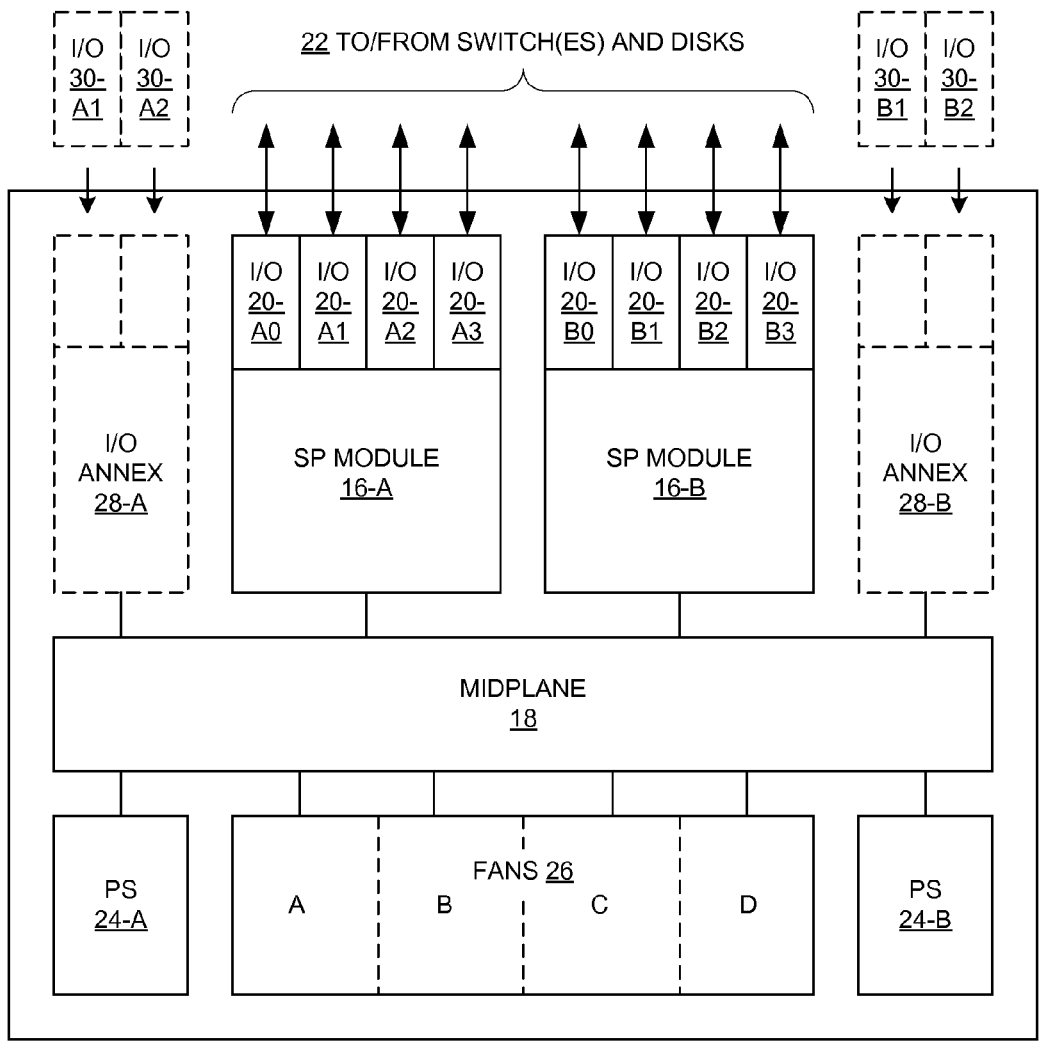
FIG. 2 is a block diagram of a storage controller in the data storage system of FIG. 1.

FIG. 2 shows a functional block diagram of the storage controller 10. A pair of storage processor (SP) modules 16 (shown as SP modules 16-A and 16-B) are connected to a midplane circuit board (midplane) 18. Each SP module 16 has a respective set of four input/output (I/O) modules 20 (shown as I/O 20-A0, 20-A1, etc.) which are connected to high-speed storage interconnect buses 22. The storage buses 22 provide connectivity to the disks 12 and switch 14 of FIG. 1. In one embodiment, I/O modules 20 of different types may be used in the storage controller 10. For example, I/O module 20-A0 may provide multiple Gigabit-Ethernet (GbE) ports, either electrical (RJ45), optical, or both, and I/O module 20-A1 may provide multiple Fibre channel (FC) optical ports. Each SP module 16 includes high-bandwidth "data mover" hardware as well as a processor complex which together implement all the control and data-moving functionality required for processing storage requests. The SP modules 16 may be configured as a redundant pair such that either can assume the processing workload of the other in the event one of the SP modules 16 fails.

Also connected to the midplane 18 are a pair of power supplies 24 (shown as PSs 24-A and 24-B) and four blowers or fans 26. The PSs 24 and fans 26 may also be configured for redundancy, such that one PS 24 can handle the entire load of the storage controller 10 in the event that the other PS 24 fails. The fans 26 exhibit redundancy in the following manner. Normally, all four fans 26 run at a nominal speed. If one fan 26 fails, then the remaining three fans 26 are fun at higher speed (e.g., full speed) at generate the necessary air flow. Once the failed fan is replaced, then all fans revert to running at nominal speed.

Also connected to the midplane 18 are a pair of I/O expansion modules 28 (shown as I/O "annexes" 28-A and 28-B). The I/O expansion modules 28 are optional, as indicated by the broken line depiction. When present, each I/O expansion module 28 provides an interface between the corresponding SP module (e.g. SP module 16-A for I/O annex 28-A) and a pair of I/O modules 30 (shown as I/O modules 30-A and 30-B). Overall, each I/O annex 28 provides fifth and sixth I/O modules 30 for a corresponding SP module 16 using two X4 PCI-Express high-speed serial data links. Examples of such PCI-Express I/O modules 30 include those functioning as host bus adapters (HBAs), such as an iSCSI or 10-GbE adapter. The additional I/O capability can be added to the storage controller 10 as required by system requirements without requiring addition of an entire additional SP module 16 with its attendant overhead, notably the cost and real-estate devoted to a storage processor complex.

Figure 3:
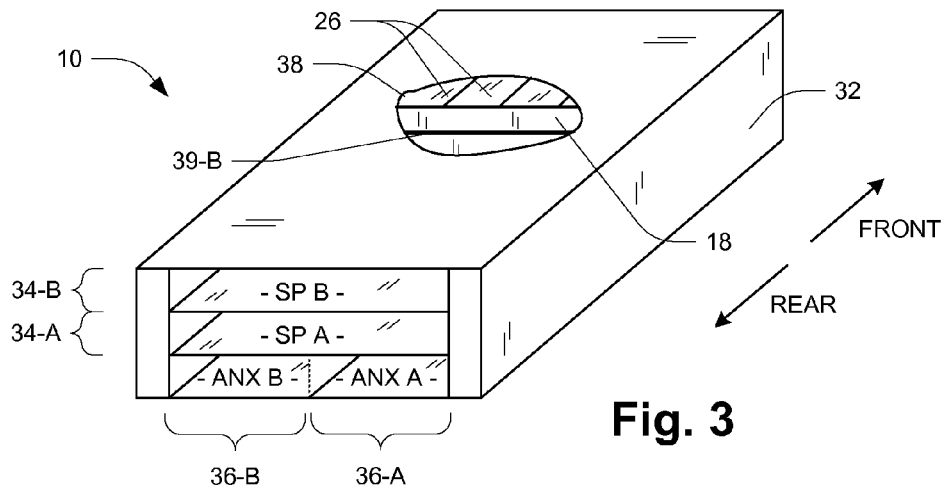
FIG. 3 is a perspective rear view of a physical embodiment of the storage controller of FIG. 2, referred to herein as a "storage processor assembly"

FIG. 3 is a rear perspective view of a physical packaging arrangement termed a "storage processor assembly" for the storage controller 10 of FIGS. 1-2. The various controller components are housed in a rack-mountable enclosure 32 of dimensions 19" wide, 4" high, and 30" deep. FIG. 3 shows an end opening at the rear of the enclosure 32. The enclosure is divided into three levels, one each for the two SP modules 16 and one level for both of the I/O annexes 28. Specifically, there are two SP mounting areas 34 (shown as 34-A and 34-B) and two I/O annex mounting areas 36 (shown as 36-A and 36-B). The SP modules 16 and I/O annexes 28 are implemented as rectangular circuit modules or "blades" that are inserted and extracted by being slid into or out of the respective mounting areas 34, 36.

As shown by a cutaway 38, the midplane 18 extends across the interior of the enclosure 32 approximately two-thirds of the way forward. An electrical connector 39-B that provides connections between the midplane 18 and the SP module 16-B is visible through the cutaway 38. Also visible are the fans 26 forward of the midplane 18. Although not shown in FIG. 3, the midplane 18 is configured by shape and inclusion of openings to permit a large rearward airflow from the fans 26 through the SP mounting areas 34 to cool the SPs 16 during operation. In one embodiment, the I/O annex mounting areas 36 is either uncooled or cooled by separate fans (not shown) residing on each I/O annex module 28.

Figure 4:
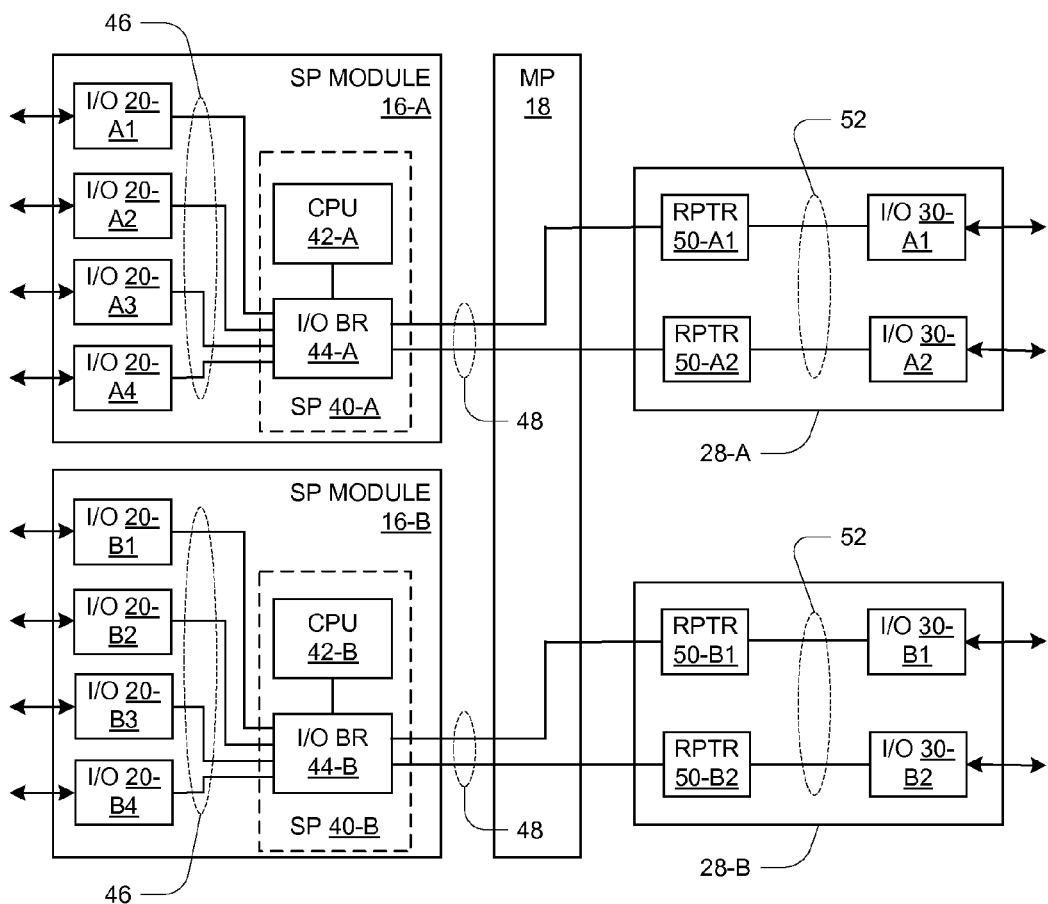
FIG. 4 is a block diagram illustrating an electrical arrangement of components in the storage controller of FIGS. 2 and 3.
Figure 5:
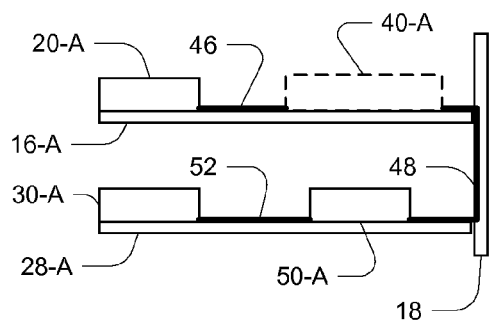
FIG. 5 is a side-view diagram depicting a mechanical arrangement of components in the storage controller of FIGS. 2 and 3.

FIGS. 4 and 5 illustrate the arrangement of the SP modules 16, midplane 18 and I/O annexes 28 in more detail. FIG. 4 is an electrical diagram, and FIG. 5 illustrates mechanical aspects including the placement of these components within the enclosure 32 of FIG. 3. Each of the SP modules 16 includes the I/O modules 20 as well as a collection of electronic components referred to as a storage processor 40. In the illustrated embodiment, each storage processor 40 is shown as including a respective central processing unit (CPU) 42 and an I/O bridge 44 which provides connectivity between the CPU 42 and the I/O modules 20 via high-speed serial data links 46. The I/O bridge 44 is also connected to additional high-speed serial data links 48 connected to a respective I/O annex 28 via the midplane 18. Each of the high-speed serial data links 46, 48 employs bi-directional differential signaling via a respective set of circuit traces, half of the traces carrying one or more serial differential signals in one direction and the other half carrying serial differential signals in the other direction. In one embodiment, each of the serial data links 46, 48 is a so-called PCI-Express link employing one or more "lanes" of bidirectional serial data transfer.

As shown, the I/O annexes 28 include the I/O modules 30 as well as respective repeater or buffer amplifiers (shown as RPTRs) 50 connected to the traces 48 as well as to traces 52 that connect the repeaters 50 with the I/O modules 30. The repeaters 50 electrically re-generate the binary data signals appearing on a given input pair of traces (such as a pair of traces 48 carrying one differential data signal) and provide the re-generated electrical signals to a corresponding output pair of traces (such as a corresponding pair of traces 52). By this action, the overall electrical distance between the I/O bridge 44 and each of the I/O modules 30 is longer than might otherwise be desirable if no repeater were used, while retaining good signal integrity of the high-speed data signals carried between these elements. More information is provided below.

FIG. 5 illustrates the mechanical arrangement of the components of FIG. 4, specifically a side elevational view. Only one SP module 16-A is shown for clarity. The SP module 16 and I/O annexes 28, which are the same length, are mounted to the midplane 18 via respective multi-terminal connectors (not shown). The I/O modules 20-A and 30-A are disposed at the outward edges of the respective modules 16-A and 28-A, these outward edges being at the rear end opening of FIG. 3, to facilitate the connection of cables by a user to the two-dimensional array of I/O modules 20, 30 thus formed. The SP 40-A is disposed more centrally on the SP module 16-A, with the traces 46 and 48 extending as shown. The repeaters 50-A are also disposed more centrally on the I/O annex 28-A (close to the midplane connector). In the view of FIG. 5, it can be readily appreciated how much longer is the electrical path between the SP 40-A and the I/O modules 30-A on the I/O annex 28-A than is the path between the SP 40-A and the I/O modules 20-A residing on the SP module 16-A. In one embodiment, the length of the traces 46 may be on the order of 6", whereas the total distance along the traces 48 and 52 may be 18" or more. Also, there are three connector sets traversed by this path (two midplane connectors and one I/O module connector), and each connector set adds a discontinuity point reducing the overall distance the signal can travel.

Figure 6:
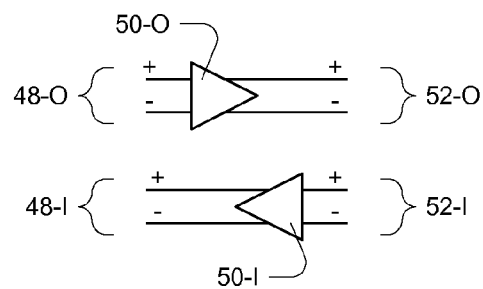
FIG. 6 is a schematic diagram of a set of repeater amplifiers in the storage controller of FIGS. 2 and 3.

FIG. 6 shows an example set of repeaters 50. For each "lane" or bidirectional serial data channel, one repeater 50-O re-generates the electrical signals from a pair of traces 48-O and provides the re-generated signals to another pair 52-O, and likewise another repeater 50-I re-generates the electrical signals from a pair of traces 52-I and provides the re-generated signals to another pair 48-I. The labels "I" and "O" in FIG. 6 represent "input" and "output" directions of data flow with respect to the SP 40.

Figure 7:
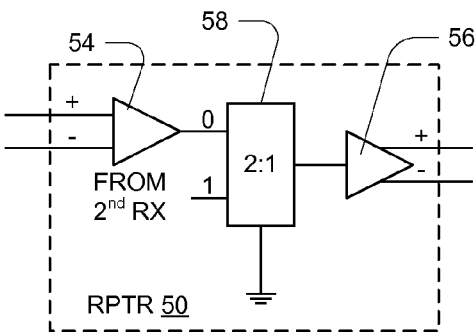
FIG. 7 is a schematic diagram of one repeater amplifier of FIG. 6.

FIG. 7 shows an example of a single repeater amplifier 50 according to one embodiment. It includes an input receiver 54 which performs differential-to-single-ended conversion, as well as an output driver 56 which performs single-ended-to-differential conversion. Between the receiver 54 and driver 56 is an analog multiplexer (shown as "2:1") 58, which has its "0" input connected to the output of the receiver 54 and its "1" input connected to the output of a separate receiver (not shown). The control input of the multiplexer 58 is connected to ground, so that the multiplexer 58 is permanently configured to select only its "0" input. The repeater 50 of FIG. 7 is an example non-standard use of a standard component. The repeater 50 has the selection functionality of a multiplexer, which is useful in many applications. However, in the illustrated application only the differential receive-and-drive capability is used. The selection functionality is deactivated by configuring the device appropriately (e.g., grounding the control input of multiplexer 58, etc). In one embodiment, a set of four repeater amplifiers 50 can be realized by a 4-channel multiplexer and serial link extender integrated circuit sold under the trade name PM8380 by PMC-Sierra, Inc. One benefit to using a multiple-channel device is to reduce the timing skew among the four serial links, as opposed to a configuration employing multiple individual devices.

Figure 8:
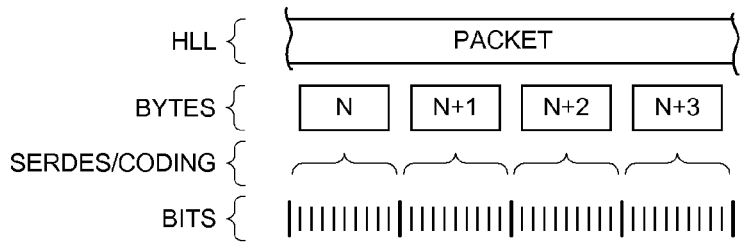
FIG. 8 is a diagram depicting multiple levels of operation of components in the storage controller of FIGS. 2 and 3.

FIG. 8 illustrates levels of operation of each of the serial data links between an SP and any of the I/O modules 20 or 30. At the lowest level, a raw stream of data bits (binary digits) is transmitted on the electrical traces 46, 48 and 52 extending between adjacent components. The stream of bits consists of successive groups of 10 bits which are 10-bit symbols of a code, specifically the well-known 8b/10b code utilized in PCI Express as well as Fibre Channel and other communications protocols. At a serializer/deserializer and coding level (SERDES/CODING), the 10-bit symbols are translated from/into 8-bit data bytes of standard character coding (e.g., Unicode). Successive bytes organized into frames or packets by higher-level-layer (HLL) logic elements. The SP 40 and the I/O modules 20 and 30 communicate with each other at this higher packet level. The repeaters 50 operate at the bit level only—they regenerate the binary electrical signals that represent the bits without performing serializing/deserializing, encoding/decoding, or any higher-level operations on packets. Beneficially, the repeaters 50 enable greater separation between the SP 40 and the I/O modules 30 but without incurring the cost and complexity of the logic for performing such operations.

While in the above disclosure the repeaters are used as part of a PCI-Express serial link, it will be appreciated that in alternative embodiments repeaters may be employed on other types of high-speed serial data links such as Fiber Channel, SATA, SAS, etc.

What is claimed is:

1. A storage system assembly, comprising:
   an enclosure having an end opening;
   a midplane circuit board in the enclosure, the midplane circuit board having first and second mounting locations and circuit traces extending therebetween;
   a storage processor module disposed in the enclosure between the end opening of the enclosure and the first mounting location of the midplane circuit board, the storage processor module including (i) a storage processor, (ii) a plurality of first input/output (I/O) interface modules at the end opening of the enclosure, and (iii) circuit traces of a plurality of high-speed serial data links, the circuit traces including first circuit traces and second circuit traces, the first circuit traces interconnecting the storage processor with respective ones of the first I/O interface modules, the second circuit traces interconnecting the storage processor with the circuit traces of the midplane circuit board; and
   an I/O expansion module disposed in the enclosure between the end opening of the enclosure and the second mounting location of the midplane circuit board, the I/O expansion module including a (i) a plurality of second I/O interface modules at the end opening of the enclosure, (ii) a set of repeater amplifiers, and (iii) circuit traces of the high-speed serial data links, the circuit traces including third circuit traces and fourth circuit traces, the third circuit traces interconnecting the repeater amplifiers with respective ones of the second I/O interface modules, the fourth circuit traces interconnecting the repeater amplifiers with the circuit traces of the midplane circuit board, such that the second, third and fourth circuit traces along with the circuit traces of the midplane circuit board interconnect the storage processor with the second I/O interface modules via the repeater amplifiers, the repeater amplifiers performing electrical regeneration of high-speed binary data signals between the third and fourth circuit traces.

2. A storage system assembly according to claim 1, wherein each of the repeater amplifiers comprises an input differential-to-single-ended receiver, an analog multiplexer, and an output single-ended-to-differential driver, the analog multiplexer being permanently configured to select the output of the receiver to supply the input to the driver.

3. A storage system assembly according to claim 1, wherein the repeaters of each serial link are arranged into one integrated circuit package.

4. A storage system assembly according to claim 1, wherein the storage processor module and the I/O expansion module are disposed on the same side of the midplane circuit board.

5. A storage system assembly according to claim 4, wherein the I/O interface modules are located at an edge of the I/O expansion module opposite from the midplane circuit board.

6. A storage system assembly according to claim 5, wherein the repeaters are located on the same plane as the I/O interface modules and on a different plane than the storage processor module.

7. A storage system assembly according to claim 6, wherein the first and second I/O interface modules form a two-dimensional array at the end opening of the enclosure.

8. A storage system assembly according to claim 1, wherein the second I/O modules are pluggable I/O modules.

* * * * *